United States Patent
Manning et al.

(10) Patent No.: US 7,419,731 B2
(45) Date of Patent: Sep. 2, 2008

(54) FUEL CONTAINER WITH RETICULATED MATERIAL

(75) Inventors: Michael P. Manning, Watervliet, NY (US); Ashish K. Modi, Troy, NY (US); Xiaoming Ren, Menands, NY (US); Lena A. Guleserian, Loudonville, NY (US)

(73) Assignee: MTI MicroFuel Cells, Inc., Albany, NY (US)

( * ) Notice: Subject to any disclaimer, the term of this patent is extended or adjusted under 35 U.S.C. 154(b) by 922 days.

(21) Appl. No.: 10/842,337

(22) Filed: May 10, 2004

(65) Prior Publication Data

US 2005/0081924 A1    Apr. 21, 2005

Related U.S. Application Data

(63) Continuation-in-part of application No. 10/688,433, filed on Oct. 17, 2003, now Pat. No. 7,255,947.

(51) Int. Cl.
*H01M 8/04* (2006.01)
(52) U.S. Cl. .......................................... 429/13; 429/34
(58) Field of Classification Search ................ 429/34, 429/13
See application file for complete search history.

(56) References Cited

U.S. PATENT DOCUMENTS

| | | | |
|---|---|---|---|
| 5,162,082 A * | 11/1992 | Elliott | ........................ 228/176 |
| 5,723,229 A | 3/1998 | Scheifers et al. | |
| 5,755,706 A * | 5/1998 | Kronenthal et al. | .......... 604/358 |
| 5,788,666 A * | 8/1998 | Atanasoska | ................... 604/20 |
| 5,904,740 A | 5/1999 | Davis | |
| 6,268,077 B1 | 7/2001 | Kelley et al. | |
| 6,443,790 B1 * | 9/2002 | Cameron | ..................... 446/15 |
| 6,506,513 B1 | 1/2003 | Yonetsu et al. | |
| 6,994,932 B2 * | 2/2006 | Kinkelaar et al. | ............. 429/34 |

OTHER PUBLICATIONS

Material Safety Data Sheet, The Sterno Group, Division of Candle Corporation of America, MSDS#0001, Revised Date: May 31, 2002, Product Name: Sterno Brand Canned Heat Cooking Fuel, pp. 1-5.
U.S. Appl. No. 10/413,983, Filing Date: Apr. 15, 2004 by Xiaoming Ren et al. for Direct Oxidation Fuel Cell Operating With Direct Feed of Concentrated Fuel Under Passive Water Management.

(Continued)

*Primary Examiner*—Stephen J. Kalafut
(74) *Attorney, Agent, or Firm*—Cesari and McKenna LLP

(57) ABSTRACT

A fuel reservoir having a reticulated material, generally a felt or a foam, disposed therein is provided. The addition of this reticulated material, either alone or in combination with a viscous fuel, assists the prevention of undesired flow of the fuel, the minimization of undesired leakages, and assists in orientation independence and uniform distribution of the fuel in the reservoir. The reticulated material enables the use of a viscous liquid fuel that has fuel diffusion rates and fuel utilization characteristics that approach those of neat liquid methanol. The material also helps create a greater surface area for evaporation, thus allowing a highly concentrated, vaporous fuel substance to be delivered to an associated fuel cell.

24 Claims, 14 Drawing Sheets

OTHER PUBLICATIONS

U.S. Appl. No. 10/454,211, Filing Date: Jun. 4, 2003 by Xiaoming Ren et al. for Passive Water Management Techniques in Direct Methanol Fuel Cells.

U.S. Appl. No. 10/688,711, Filing Date: Oct. 17, 2003 by Xiaoming Ren et al. for Fuel Composition in Fuel Cartridges for DMFCS.

U.S. Appl. No. 10/413,986, Filing Date: Apr. 15, 2003 by Robert S. Hirsch et al. for Vapor Feed Fuel Cell System With Controllable Fuel Delivery.

U.S. Appl. No. 10/413,982, Filing Date: Apr. 15, 2003 by Juan J. Becerra et al. for Apparatus for Refueling a Direct Oxidation Fuel Cell.

U.S. Appl. No. 10/607,699, Filing Date: Jun. 27, 2003 by Alan J. Soucy for Methods of Providing Refueling for Fuel Cell-Powered Devices.

U.S. Appl. No. 10/842,336, Filing Date: May 5, 2004 by Xiaoming Ren et al. for Fuel Formulation for Direct Methanol Fuel Cell.

U.S. Appl. No. 10/041,301, Filing Date: Jan. 8, 2002 by Juan J. Becerra et al. for Fuel Container and Delivery Apparatus for a Liquid Feed Fuel Cell System.

U.S. Appl. No. 10/688,433, Filing Date: Oct. 17, 2003 by Juan J. Becerra et al. for Fuel Substance and Associated Cartridge for Fuel Cell.

* cited by examiner

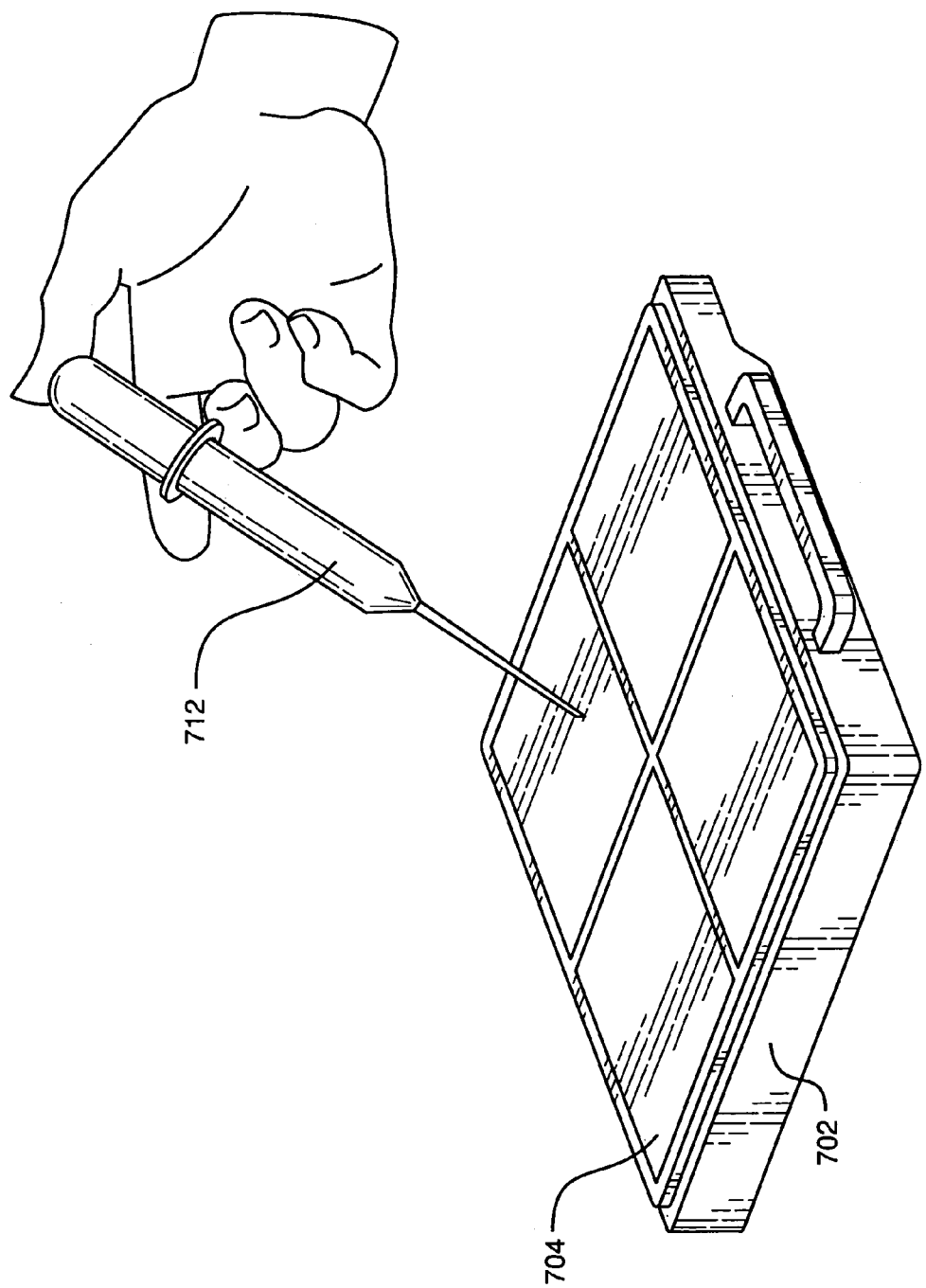

FUEL CONTAINER WITH RETICULATED MATERIAL

CROSS REFERENCES TO RELATED APPLICATIONS

The present application is a continuation-in-part of commonly assigned U.S. patent application Ser. No. 10/688,433, filed on Oct. 17, 2003 now U.S. Pat. No. 7,255,947, by Becerra et al. for a FUEL SUBSTANCE AND ASSOCIATED CARTRIDGE FOR FUEL CELL, which is incorporated herein by reference. This application is related to commonly-assigned U.S. patent application Ser. No. 10/842,336, filed on even date herewith, by Ren et al., for a FUEL FORMULATION FOR DIRECT METHANOL FUEL CELL, which is incorporated herein by reference.

BACKGROUND OF THE INVENTION

1. Field of the Invention

This invention relates generally to direct oxidation fuel cells, and more particularly, to fuel storage for such fuel cells.

2. Background Information

Fuel cells are devices in which electrochemical reactions are used to generate electricity. A variety of materials may be suited for use as a fuel depending upon the materials chosen for the components of the cell. Organic materials, such as methanol or natural gas, are attractive fuel choices due to the their high specific energy.

Fuel cell systems may be divided into "reformer-based" systems (i.e., those in which the fuel is processed in some fashion to extract hydrogen from the fuel before it is introduced into the fuel cell system) or "direct oxidation" systems in which the fuel is fed directly into the cell without the need for separate internal or external processing. Most currently available fuel cells are reformer-based fuel cell systems. However, because fuel processing is expensive and generally requires expensive components, which occupy significant volume, reformer-based systems are presently limited to comparatively large, high power applications.

Direct oxidation fuel cell systems may be better suited for a number of applications in smaller mobile devices (e.g., mobile phones, handheld and laptop computers), as well as in some larger applications. In direct oxidation fuel cells of interest here, a carbonaceous fuel (including, but not limited to, liquid methanol or an aqueous methanol solution) is introduced to the anode face of a membrane electrode assembly (MEA).

One example of a direct oxidation fuel cell system is a direct methanol fuel cell system or DMFC system. In a DMFC system, a mixture comprised of predominantly methanol or methanol and water is used as fuel (the "fuel mixture"), and oxygen, preferably from ambient air, is used as the oxidizing agent. The fundamental reactions are the anodic oxidation of the fuel mixture into $CO_2$, protons, and electrons; and the cathodic combination of protons, electrons and oxygen into water. The overall reaction may be limited by the failure of either of these reactions to proceed to completion at an acceptable rate, as is discussed further hereinafter.

Typical DMFC systems include a fuel source, fluid and effluent management systems, and air management systems, as well as a direct methanol fuel cell ("fuel cell"). The fuel cell typically consists of a housing, hardware for current collection, fuel and air distribution, and a membrane electrode assembly ("MEA") disposed within the housing.

The electricity generating reactions and the current collection in a direct oxidation fuel cell system generally take place within the MEA. In the fuel oxidation process at the anode, the products are protons, electrons and carbon dioxide. Protons (from hydrogen found in the fuel and water molecules involved in the anodic reaction) are separated from the electrons. The protons migrate through the membrane electrolyte, which is non-conductive to the electrons. The electrons travel through an external circuit, which connects the load, and are united with the protons and oxygen molecules in the cathodic reaction, thus providing electrical power from the fuel cell.

A typical MEA includes an anode catalyst layer and a cathode catalyst layer sandwiching a centrally disposed protonically-conductive, electronically non-conductive membrane ("PCM", sometimes also referred to herein as "the catalyzed membrane"). One example of a commercially available PCM is NAFION® (NAFION® a registered trademark of E.I. Dupont de Nemours and Company), a cation exchange membrane based on polyperflourosulfonic acid, in a variety of thicknesses and equivalent weights. The PCM is typically coated on each face with an electrocatalyst such as platinum, or platinum/ruthenium mixtures or alloy particles. A PCM that is optimal for fuel cell applications possesses a good protonic conductivity and is well-hydrated. On either face of the catalyst coated PCM, the MEA typically includes a diffusion layer. The diffusion layer on the anode side is employed to evenly distribute the liquid or gaseous fuel over the catalyzed anode face of the PCM, while allowing the reaction products, typically gaseous carbon dioxide, to move away from the anode face of the PCM. In the case of the cathode side, a diffusion layer is used to allow a sufficient supply of and a more uniform distribution of gaseous oxygen to the cathode face of the PCM, while minimizing or eliminating the collection of liquid, typically water, on the cathode aspect of the PCM. Each of the anode and cathode diffusion layers also assist in the collection and conduction of electric current from the catalyzed PCM through the load.

Direct oxidation fuel cell systems for portable electronic devices ideally are as small as possible for a given electrical power and energy requirement. The power output is governed by the reaction rates that occur at the anode and the cathode of the fuel cell operated at a given cell voltage. More specifically, the anode process in direct methanol fuel cells, which use acid electrolyte membranes including polyperflourosulfonic acid and other polymeric electrolytes, involves a reaction of one molecule of methanol with one molecule of water. In this process, water molecules are consumed to complete the oxidation of methanol to a final $CO_2$ product in a six-electron process, according to the following electrochemical equation:

$$CH_3OH + H_2O \Rightarrow CO_2 + 6H^+ + 6e^- \quad (1)$$

Since water is a reactant in this anodic process at a molecular ratio of 1:1 (water:methanol), the supply of water, together with methanol to the anode at an appropriate weight (or volume) ratio is critical for sustaining this process in the cell. In fact, in typical DMFC systems the water:methanol molecular ratio in the anode of the DMFC has to significantly exceed the stoichiometric 1:1 ratio suggested by process (1), based on the prior art of direct methanol fuel cell technology. This excess is required to guarantee complete anodic oxidation to $CO_2$, rather than partial oxidation to either formic acid, or formaldehyde, $4e^-$ and $2e^-$ processes, respectively, described by equations (2) and (3) below:

$$CH_3OH + H_2O \Rightarrow HCOOH + 4H^+ + 4e^- \quad (2)$$

$$CH_3OH \Rightarrow H_2CO + 2H^+ + 2e^- \quad (3)$$

In other words, equations (2) and (3) are partial processes that are not desirable and which might occur if the balance of water and methanol is not maintained correctly during a steady state operation of the cell. Particularly, as is indicated in process (3), which involves the partial oxidation of methanol, water is not required for this anode process and thus, this process may dominate when the water level in the anode drops below a certain point. The consequence of process (3) domination, is an effective drop in methanol energy content by about 66% compared with consumption of methanol by process (1), which indicates a lower cell electrical energy output. In addition, it could lead to the generation of undesirable anode products such as formaldehyde.

Several techniques have been described for providing an effective methanol/water mixture at the anode catalyst in a DMFC. Some systems include feeding the anode with a very dilute methanol solution and actively circulating water found at the cathode back to the cell anode and dousing recirculated liquid with neat methanol stored in a reservoir. Other systems are passive systems that require no pumping and which can carry a high concentration of fuel. Some of these include recirculation of water; however, other systems have been described in which water does not need to be recirculated from the cathode because water is pushed back from the cathode through the membrane to the anode aspect.

One example of a non-recirculating system is described in commonly-assigned U.S. patent application Ser. No. 10/413,983, filed on Apr. 15, 2003, by Ren et al. for a DIRECT OXIDATION FUEL CELL OPERATING WITH DIRECT FEED OF CONCENTRATED FUEL UNDER PASSIVE WATER MANAGEMENT, which is incorporated herein by reference, and U.S. patent application Ser. No. 10/454,211, which was filed on Jun. 4, 2003 now U.S. Pat. No. 7,282,293 by Ren et al. for PASSIVE WATER MANAGEMENT TECHNIQUES IN DIRECT METHANOL FUEL CELLS, which is also incorporated herein by reference.

Some of these techniques may incorporate a vaporous fuel being delivered to the anode aspect for the reactions. In the case of delivering a vaporous fuel, the above-cited patent applications describe providing a pervaporation membrane that effects a phase change from a liquid feed fuel to a vaporous fuel, which is then delivered to the anode aspect, as a vapor.

As noted, the fuel cells operating with vaporous fuels typically include the above-mentioned pervaporation membrane, which effects the phase change from liquid to vapor prior to the fuel being delivered to the anode aspect of the fuel cell. However, such pervaporation membranes may need to be specially engineered, which can be costly. In addition, some such membranes, though useful for delivering the vaporous fuel, can, degrade in the presence of the methanol fuel, compromising the delivery of fuel.

Some systems that use a liquid fuel require additional circulation systems, including, pumps, valves and other fluid management components and control systems to deliver the fuel at a controlled rate and in the desired manner. This typically requires additional components that consume power, increasing the parasitic losses within the system, and adding additional complexity, expense, and volume. In handheld electronic devices and other portable electronic devices, form factors are critical and a premium is placed on the ability of a power source to fit within the designated form factors. Additional recirculation subsystems, including pumps, valves and other fluid management equipment and components may increase the size of the overall fuel cell system, and in some cases may increase it significantly. A liquid fuel can also require a more complex fuel delivery system that may include an expansion bladder, which, when compressed, expresses the fuel in a controlled manner. One example of such a system is described in U.S. patent application Ser. No. 10/041,301, filed on Jan. 8, 2002 now U.S. Pat. No. 7,074,511, by Becerra et al. for a Fuel Container and Delivery Apparatus for a Liquid Feed Fuel Cell System, which is incorporated herein by reference. However, even though such expansion bladders and optional force-applying elements may be desirable in some instances, in other instances they can increase the volume, complexity and weight of the fuel delivery cartridge.

Some of the disadvantages with certain presently existing liquid fuel storage and delivery subsystems can be addressed using a vapor fed system. For example, the systems such as that described in the above-cited commonly owned U.S. patent application Ser. No. 10/413,983, which has been incorporated herein by reference, use a liquid fuel which then undergoes a phase change when passing through a pervaporation membrane, and thus such systems still may need to carry liquid fuel in a storage tank or other container. Also, this liquid fuel may have a tendency to flow within the container undesirably as the orientation of the container changes during use, which may tend to reduce the fuel efficiency to the anode.

Another issue that arises with respect to usage of carbonaceous fuel, such as methanol, in a consumer electronic device, is that of maintaining the integrity of the cartridge so that there is no leakage of the fuel. For example, when using a liquid fuel, a crack in the fuel cartridge may result in the fuel leaking out of the cartridge. Sometimes additives are employed within a container to cause the fuel to be more recognizable. Safe disposal of fuel cartridges after the fuel supply is exhausted is also a consideration with respect to consumer use of direct oxidation fuel cells.

Some of the disadvantages with certain liquid fuel and vapor fed system can be addressed using a gel-based fuel substance and related system, such as that described in commonly-assigned U.S. patent application Ser. No. 10/688,433, filed on Oct. 17, 2003 now U.S. Pat. No. 7,255,947, by Becerra et al. for a FUEL SUBSTANCE AND ASSOCIATED CARTRIDGE FOR FUEL CELL, which is incorporated herein by reference. In such systems, however, depending on the operating conditions there may be lower feed rates and fuel extraction efficiencies than desired, in some cases, especially in low temperature environments or where the fuel is exposed to significant vibration or shock.

Therefore, there remains a need for a fuel container, and an associated fuel formulation in which the fuel is a freely flowing liquid, yet controlled against substantial undesirable flow within the container, has orientation independence, and maintains a high feed rate and high fuel extraction efficiency with less crusting and less affectivity to vibration and shock. It is also an object of the invention to provide a safe, easy to handle and low-cost fuel container and associated fuel formulation for use with direct oxidation fuel cells that may be readily employed in consumer electronic devices.

SUMMARY OF THE INVENTION

The disadvantages of these and other techniques are overcome by the solutions provided by the present invention, which includes a unique fuel substance to which a thickening substance is added, to form a viscous fuel, and a fuel reservoir for storing fuel. As used herein, the word "fuel substance" shall include a carbonaceous fuel substantially comprised of alcohols such as methanol and ethanol, alcohol precursors, dimethyloxymethane, methylorthoformate or combinations thereof and aqueous solutions thereof, and other carbonaceous substances amenable to use in direct oxidation fuel cells and fuel cell systems. The illustrative embodiment of the invention includes substantially neat methanol as the fuel substance.

The thickening substance may include any of a variety of polymers. The illustrative embodiment of the invention includes a thickening substance sold commercially under the trade name Carbopol®, which is a hydrophobically modified cross-linked polyacrylate polymer designed to impart thickening properties to liquids where the proper pH is maintained.

Depending upon the thickening substance being employed, it may be desirable, in addition to the thickening substance, to add a further substance to balance the pH of the mixture, because the fuel substance can become acidic when certain thickening substances are added to neat methanol. A suitable pH balancing substance is, for example, sodium hydroxide. In addition, it may be desirable to include additives, including but not limited to colorants, odorants, bitters and other additives that provide desired functionality. Alternatively, it may be desirable to modify the thickening substance in such a fashion that functional groups are attached to the polymer.

The fuel substance combined with the thickening substance, and additives, if any, together form the unique "viscous fuel" of the present invention, which provides benefits over previous fuels, including performance enhancements and desirable physical characteristics. The viscous fuel may then be placed into a fuel reservoir of a fuel cartridge constructed in accordance with the present invention. Disposed within the fuel reservoir is a reticulated material, generally a felt or a foam. The addition of this reticulated material, either alone or in combination with the viscous fuel, assists the prevention of undesired flow of the fuel, and minimization of undesired leakages. The material also helps create more surface area for evaporation, thus allowing a highly concentrated, vaporous fuel substance to be delivered to an associated fuel cell.

The inventive fuel cell cartridge can be attached to a direct oxidation fuel cell in a manner that allows for methanol to be easily delivered to the anode face of the catalyzed membrane electrolyte, thus comprising a direct oxidation fuel cell system, which can be used to power an application device or to back up a battery that is powering an application device. Alternatively, the viscous fuel of the present invention can be disposed directly into a suitable compartment in an application device or in a fuel cell system.

BRIEF DESCRIPTION OF THE DRAWINGS

The invention description below refers to the accompanying drawings, of which:

FIG. 7A is a fuel container in accordance with the present invention in an embodiment for fueling with needles;

Figure 1:
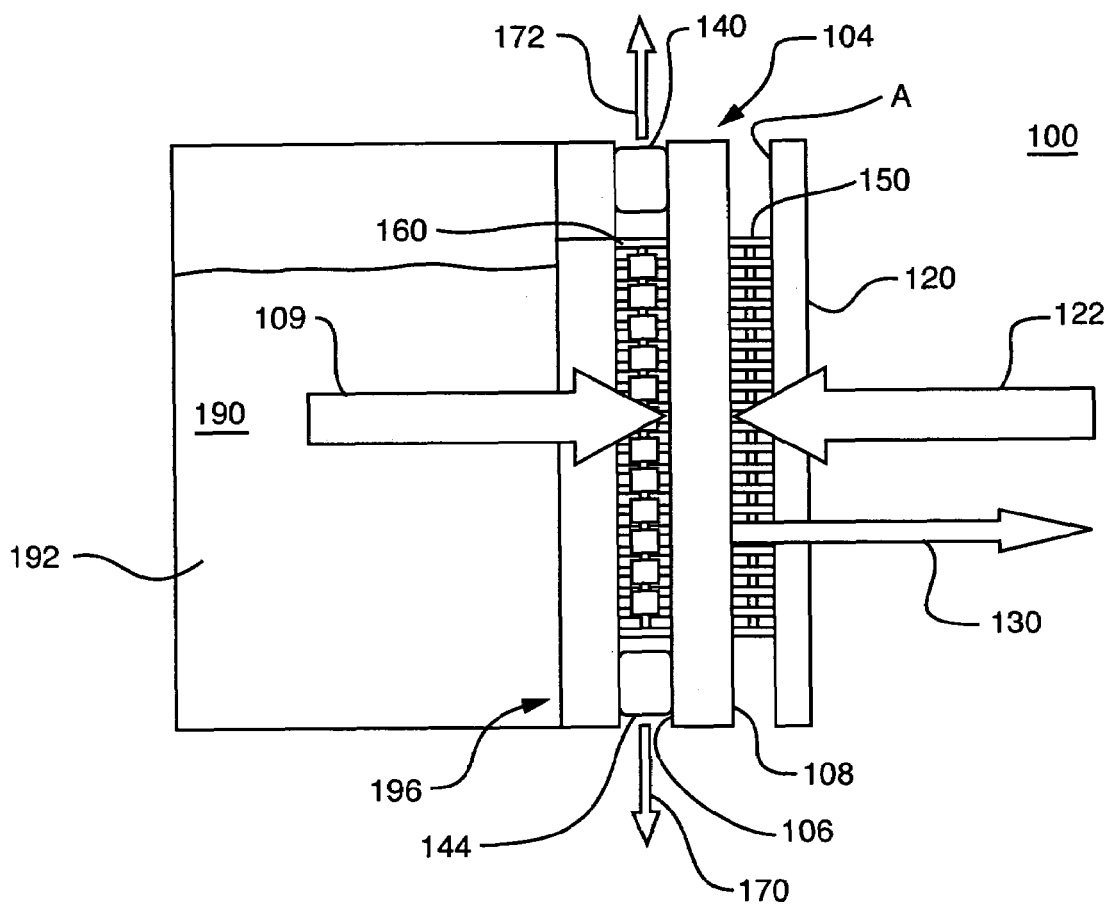
FIG. 1 is a schematic illustration of a portion of the fuel cell system with the cartridge of the present invention attached thereto.

DETAILED DESCRIPTION OF AN
ILLUSTRATIVE EMBODIMENT

Fuel Formulation and Properties

In accordance with the present invention, a viscous fuel is formulated from a fuel substance, thickening substances, and additives, if any, for use in a direct oxidation fuel cell. A portion of the composition of the fuel substance is substantially neat methanol. A thickening substance is added, which imparts thickening, thereby increasing viscosity, while still maintaining the fuel as a freely flowing liquid. In accordance with one implementation of the invention, the thickening substance is a chemical sold commercially under the trademark Carbopol® EZ-3 helogy modifier, which is a hydrophobically modified cross-linked polyacrylate polymer sold by Noveon, Inc. of 9911 Brecksville Road, Cleveland, Ohio 44141-3247, USA. It is desirable to use a formulation that is non-hazardous.

Depending on the precise formulation of the thickener, it may be necessary or desirable to include a pH balancing substance. In accordance with one aspect of the invention, sodium hydroxide is added to balance the pH. The substance can become acidic (with an approximate pH of 4.0) when the Carbopol® EZ-3 is added. Balancing the pH is desirable because it protects the components of the fuel cell cartridge, to be described herein, from the potentially corrosive viscous fuel mixture, and assists in the formation of the viscous fuel.

The following table provides one example of the chemical composition of the viscous fuel in accordance with the present invention, and produces a fuel of approximately 400 millipascal seconds (mPa s). It should be understood that the preceding table is meant to be taken as an example of one possible formulation, and is not meant to limit the scope of the invention to the numbers shown.

|  | Mass (grams) | Weight (%) |
| --- | --- | --- |
| MeOH | 125.00 | 99.55% |
| Carbopol | 0.56 | 0.44% |
| NaOH | 0.02 | 0.01% |
| Total | 125.58 | 100.00% |

It should also be understood that any range of methanol is within the scope of the invention, such as when other additives are included in the solution, including, but not limited to those described in detail below. Typically, this range is an amount greater than 50% by weight, and preferably greater than 95%.

Thickening and pH Balancing Substances

Other thickeners or solidifying substances, other than these mentioned herein, may be used while remaining within the scope of the invention. The thickening substance may, by way of example, and not by way of limitation, be selected from a group consisting of cross-linked vinyl polymers or uncross-linked vinyl polymers including poly alkyl acetates, polyalkyl acrylates, poly (N-alkylacrylamides), vinyl alkanoates, poly acrylic acids, polymethacrylic acid, alkyl esters, polyacryl amides, polyvinyl amines, polymers or copolymers containing monomers containing cationic ion-exchange groups.

In addition cellulose polymers, such as cellulose ether, hydroxyethyl cellulose, hydroxypropyl methyl cellulose, ethyl cellulosestarches, pregellatinized starch, polysaccharides, protein gels, or silicone oil (poly dimethyl siloxane), polyurethane gel may be used to form the thickening substance. The thickening substance may be any of an ionic, non-ionic or amphoteric substance.

Similarly, other pH adjusters, such as alkaline metal hydroxide, alkaline earth metal hydroxide, ammonium, amine may be used to adjust an acidic viscous fuel mixture containing polymeric acid to bring the pH of the viscous fuel substance to neutral or otherwise adjust the pH of the viscous fuel substance while remaining within the scope of the present invention.

Viscosity

It is desirable to formulate the viscous fuel with sufficient viscosity such that it remains viscous at the relevant operating and ambient temperatures of the fuel cell with which it is to be used. For example, and not by way of limitation, neat methanol at 25 degrees Celsius and at standard pressure, has a viscosity of 0.544 millipascal seconds (mPa s). In order to achieve the desired results and benefits outlined herein, the viscosity of the fuel substance is altered in accordance with the invention such that its viscosity is between 300 mPa s and 5000 mPa s at 25 degrees Celsius and at standard pressure. The resulting viscous fuel is still a freely flowing liquid within this range, and has substantially similar diffusion characteristics as liquid methanol would in similar conditions, yet it has the advantages associated with increased viscosity, such as decreased incidence of undesirable flow within the container and leakage, for example.

By increasing the viscosity of the viscous fuel only slightly, various fuel delivery systems which provide significant benefits, can be implemented. The thickening substance preferably constitutes a small fraction of the viscous fuel, preferably less than 1% by weight, and more preferably less than about 0.5% by weight, though it may be necessary or desirable to increase or decrease the amount of the thickening substance to adjust viscosity. With the addition of other materials described within the present invention, the neat methanol content is preferably greater than 99%, and more preferably greater than 99.5%, thereby creating a highly-concentrated viscous fuel. This is in contrast to a gel fuel, such as that described in above-mentioned application Ser. No. 10/688, 433, where the neat methanol content reached only 98.3%. In other circumstances, an even less viscous fuel may be desirable in which case a different percentage or type of thickener can be used while remaining within the scope of the present invention. Thus, the viscosity of the viscous fuel can be readily adjusted depending upon the particular application with which the invention is to be employed.

To contrast the current viscous fuel with the gel fuel mentioned above, it is important not only to look at the physical differences, but also the performance characteristics of each. As to the physical difference, the present invention uses a viscous fuel with viscosity in the range of 300 mPa s and 5,000 mPa s, and more preferably a fuel with a viscosity between 350 and 450 mPa s. This viscosity is approximately equivalent to that of a freely flowing, slightly oily liquid. In a preferred embodiment of the gel application, the gel fuel had a viscosity of 48,000 mPa s, which is clearly beyond the range of the viscous fuel of the present invention. In sharp contrast to the oily liquid, this viscosity of the gel fuel describes a substantially solid, gelatinous substance.

Under certain conditions, the viscous fuel may also provide advantages over the use of a gel fuel. For example, in some situations, as the gel fuel evaporates, it may leave behind a residual crust from the thickening solution, which can create a blockage that impedes fuel flow through the barrier layer and inhibit proper delivery of fuel to the fuel cell. By way of contrast, the viscous fuel has a much lower concentration of the thickening solution, and therefore has a much lower risk of crusting within the fuel container. Also, the viscous fuel has a higher extraction efficiency (84% at 30° C. with 5% relative humidity (RH) as opposed to 77%) than the gel fuel, and also a higher feed rate, allowing is the fuel cell to achieve an areal power density of 800 $mA/cm^2$ at 30° C. with 95% relative humidity as opposed to 600 $mA/cm^2$ generated with a gel fuel.

Because the viscous fuel has a higher fuel evaporation rate than a gel fuel, it is possible to deliver more fuel to the active area of the fuel cell under identical operating conditions. This is particularly useful for starting the fuel cell and when the fuel cell is operating in relatively cool environments. Another important consideration, is that the feed rate of the viscous fuel does not exhibit substantial effects following vibration or shock. These stresses can, for example, be caused by transportation and shipping, or in use under fairly typical operating conditions.

Once the viscous fuel is formulated, in accordance with the above-identified composition, additional neat methanol can be added if it is desired to obtain a lower solids content. In addition, deionized water can be added to achieve a lower molarity concentration and a lower solid content, depending upon the particular application with which the invention is to be employed. Other liquids could also be added including, as noted, additional methanol or to increased water in order to decrease the molarity of the mixture, or adjust the viscosity of the fuel.

Additives

As noted herein, safety additives can be mixed into the viscous fuel in order to minimize at least some hazards that may be associated the use of the fuel substance. These examples include colorants, flame luminosity, bitters, and other such chemicals which render the viscous fuel more recognizable to the consumer so that hazardous contact therewith can be avoided. In addition, flame-retardants can be added to the viscous fuel to minimize the risk of fire hazard. Alternatively, the thickening substance can be modified and functional groups added to the thickening substance, which will improve the safety of the viscous fuel.

In addition to adding safety and warning features, it can sometimes be difficult to create a substantially homogenous distribution of the fuel and thickening substance in the fuel formulation due to the binding tendencies of the combined viscous fuel. In both instances it may be desirable to add a small amount (typically less than 0.25%) of high surface area carbon particles into the methanol prior to adding the thickening agent. One example of commercially available high surface area carbon particles is sold by Cabot Corporation of Billerica, Mass. under the trade name Monarch 880. Adding such a substance can provide color, as well as assist the binding of the carbon particles in the fuel solution, allowing for a more concentrated fuel formulation.

The following table provides one example of the chemical composition of the viscous fuel in accordance with this additive embodiment of the present invention. The viscosity of the fuel set forth herein is approximately 400 mPa s. It should be understood that the following table is meant to be taken as an example of one possible formulation, and is not meant to limit the scope of the invention to the numbers shown.

|  | Mass (grams) | Weight (%) |
| --- | --- | --- |
| MeOH | 125.00 | 99.54% |
| Carbopol | 0.55 | 0.44% |
| NaOH | 0.02 | 0.01% |
| 880 Carbon | 0.01 | 0.01% |
| Total | 125.58 | 100.00% |

The viscous fuel can also contain other polymeric additives to incorporate desired properties to the viscous fuel. For example, a polymeric ingredient forms a polymer film on the viscous fuel surface at high temperatures to decrease the methanol evaporation rate. For example, polymerization by condensation of —OH groups can be excited at elevated temperatures, such as high temperatures caused by an overheated abnormal fuel cell operation or fire. A lowered methanol evaporation rate is thus provided by the polymeric film, which forms a protective skin over the viscous fuel and thus adds the benefits of safety to the fuel cartridge and fuel cell operation in case of high temperature conditions.

Functionally, when the viscous fuel is exposed, the methanol evaporates from the viscous fuel and the vaporous methanol passes through an optional fuel vapor-permeable layer (FVPL, described in detail hereinafter), and is introduced to the fuel cell system. Methanol delivery is further driven by the concentration gradient that is established between the viscous fuel and the anode aspect of the fuel cell system as methanol is consumed in the electricity generating reactions. The inventive viscous fuel may be placed in a cartridge designed in accordance with the present invention to provide controlled delivery of the methanol vapor to an associated direct oxidation fuel cell system.

Fuel Cartridge

More specifically, FIG. 1 is a simplified schematic illustration of one embodiment of a direct oxidation fuel cell that may be used with the present invention. The figure illustrates one embodiment of a direct oxidation fuel cell for purposes of description, though the fuel cell with which the invention is actually used may include a number of other components in addition to those shown while remaining within the scope of the present invention. Many alternative fuel cell architectures are within the scope of the present invention. Further, the illustrative embodiment of the invention is a DMFC with the fuel substance being substantially comprised of neat methanol. It should be understood, however, that it is within the scope of the present invention that other fuels may be used in an appropriate fuel cell. Thus, as noted, the word "fuel substance" shall include a substance that is substantially comprised of alcohols such as methanol and ethanol, alcohol precursors, dimethyloxymethane, methylorthoformate or combinations thereof and aqueous solutions thereof, and other carbonaceous substances amenable to use in direct oxidation fuel cells and fuel cell systems.

The fuel cell 100 (FIG. 1) includes a catalyzed membrane electrolyte 104, which may be a protonically conductive, electronically non-conductive membrane, sometimes referred to herein as a "PCM". As noted, in certain applications of the invention, an intrinsically protonically conductive membrane may be employed, though the invention is not limited to such membranes. One example of the material that may be used for the catalyzed membrane, which is commercially available is NAFION®, a registered trademark of E.I. Dupont de Nemours and Company, a cation exchange membrane based on a polyperflourosulfonic acid in a variety of thicknesses and equivalent weights. The membrane is typically coated on each face with an electrocatalyst such as platinum or a platinum/ruthenium mixture or allied particles. Thus, following the application of the appropriate catalyst, it is referred to herein as the "catalyzed membrane electrolyte." One face of the catalyzed membrane electrolyte is the anode face or anode aspect 106. The opposing face of the catalyzed membrane electrolyte 104 is on the cathode side and is herein referred as the cathode face or the cathode aspect 108 of the membrane electrolyte 104.

The anode reaction is:

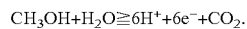

In accordance with this reaction, one molecule of methanol and one molecule of water react at the anode face 106 of the membrane electrolyte 104, the result of which is that 6 protons ($6H^+$) cross through the membrane 104 as illustrated by the arrow 109. This is made possible by the well-hydrated NAFION® substance of the membrane, which allows the protons to be carried across the membrane 104. On the cathode side, ambient air is introduced into the cathode portion of the fuel cell 100 via optional cathode filter 120 as illustrated by the arrow 122. The reaction at the cathode aspect 108 of the membrane 104 is:

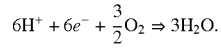

Thus, the protons and electrons combine with oxygen in the ambient air at the cathode face 108 to form water ($H_2O$). This water can escape from the cathode face of the cell primarily in the form of water vapor, but also as liquid water as illustrated by the arrow 130.

At the anode side, the fuel is delivered through anode diffusion layer 160, and the anode reaction includes the generation of carbon dioxide at the anode aspect 106 of the is membrane 104. Carbon dioxide exits the fuel cell 100 via carbon dioxide removal channels, or openings, illustrated at 140 and 144, in the direction of the arrows 172 and 170, respectively.

It is desirable to avoid excess water loss at the cell cathode in order for the cell to be operable with neat methanol feed at the cell anode without water recovery from cell cathode. To prevent liquid water from penetrating through the cathode backing, a highly hydrophobic backing layer 150 with submicrometer pores is used. The static hydraulic pressure generated by the capillary force of the hydrophobic micropores and exerted on the liquid water is sufficiently high to drive the liquid water back, even through a nonporous polymer electrolyte membrane, such as NAFION®, to the cell anode. In accordance with the present invention, the viscous fuel 190 is contained within a fuel cartridge 192 that is then connected to the fuel cell 100, at FVPL 196. The utility of the invention disclosed herein is not limited to the fuel cell architecture disclosed herein, or any other particular fuel cell, rather it is applicable to any fuel cell system or architecture in which an unreformed, carbonaceous, vaporous fuel is delivered to the anode aspect of the fuel cell.

Figure 2:
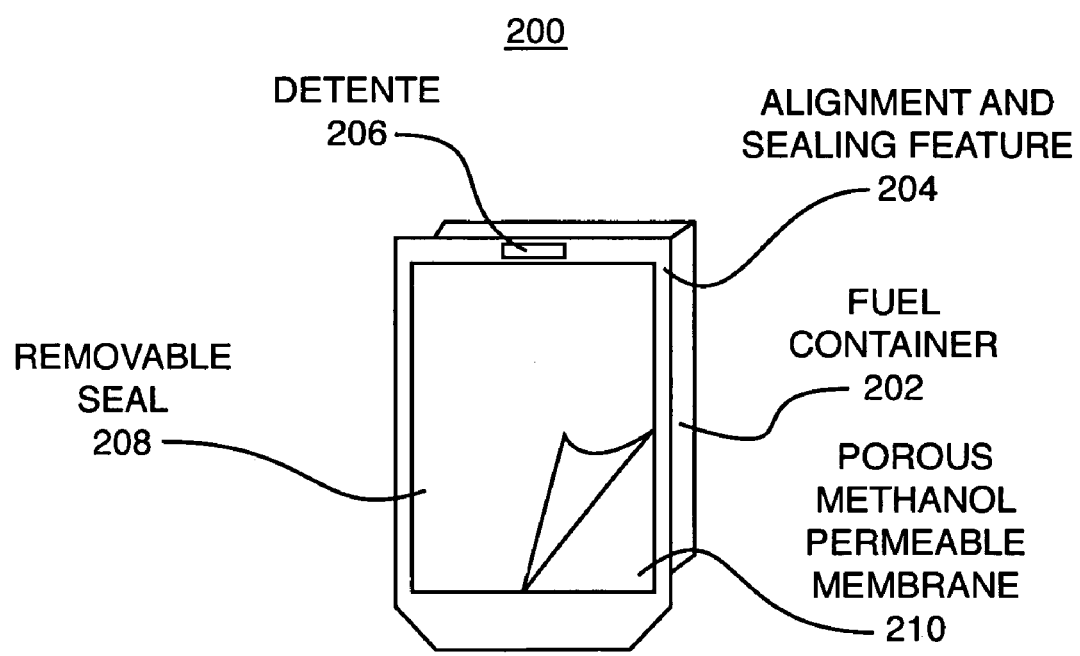
FIG. 2 is an isomeric illustration of a fuel cartridge in accordance with the present invention.
Figure 3:
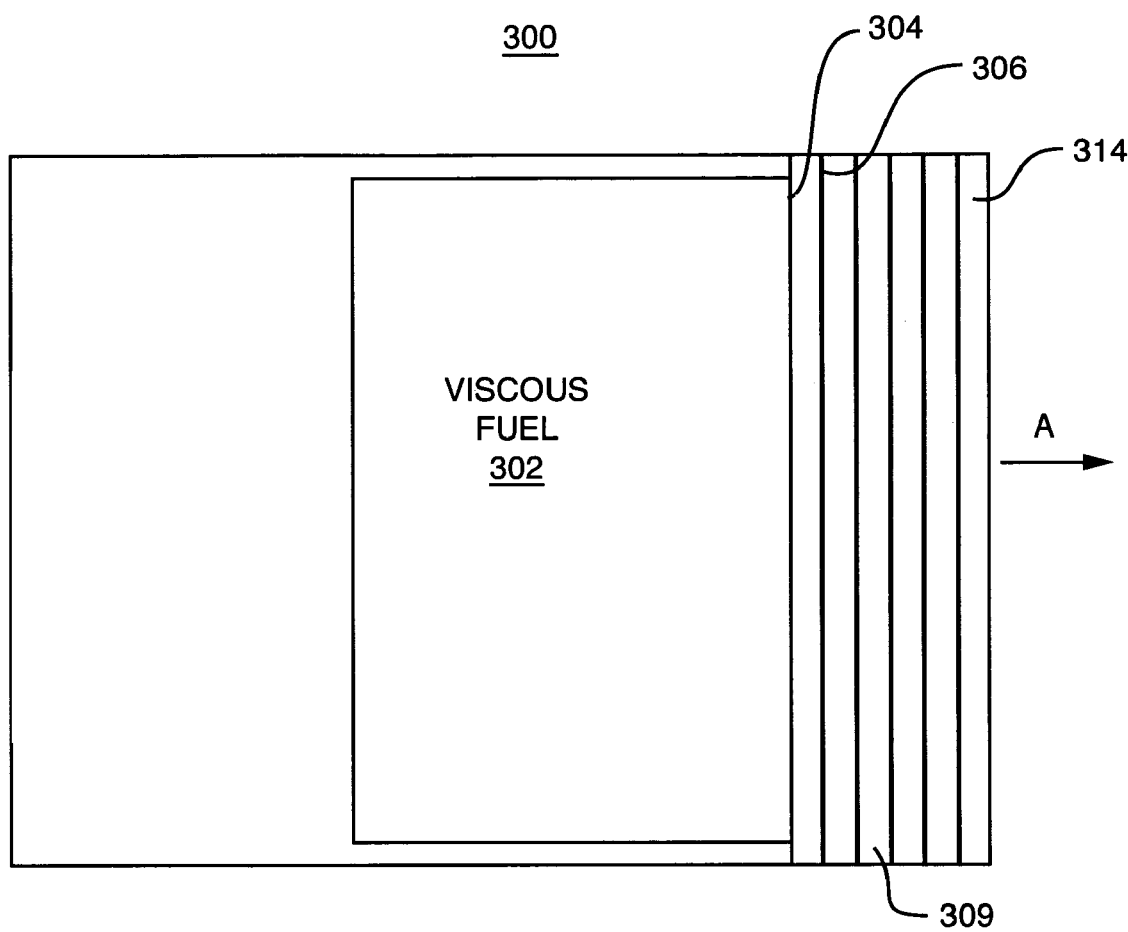
FIG. 3 is a schematic cross section of a fuel cartridge including multiple FVPSs.

Several different aspects of fuel cells that may be used with the present invention will now be described with reference to FIGS. 2 through 4, and it should be understood that the various geometries and components for the fuel cartridges illustrated in those figures may alternatively be employed as the fuel cartridge 192 in FIG. 1, or as one component within the fuel cartridge 192 of FIG. 1. Referring to FIG. 2, a fuel cell cartridge 200 is illustrated that has a fuel container compartment 202 that houses the viscous fuel. A flange 204 may include alignment and sealing features to assist in connecting the cartridge 200 to the fuel cell system (not shown in FIG. 2). Flange 204 can be readily adapted to provide a robust sealed fluid connection to the application device or fuel cell system being fueled by the viscous fuel, in accordance with the present invention, by incorporating gaskets or other methods known to those skilled in the art. A detente 206 allows for fastening and detachment of the fuel cartridge 200 to and from the fuel cell is (not shown). Those skilled in the art will recognize that it may be necessary or desirable to incorporate détente 206 or other coupling enhancing features to other aspects of the container 202.

A removable seal 208 is provided to cover the FVPL 210 in order to prevent the undesired escape of the fuel substance vapors or viscous fuel from the cartridge prior to connecting the fuel cartridge to the fuel cell system. The removable seal 208 is a peelable, methanol-impermeable film that is bonded over a porous methanol-permeable FVPL 210. The peelable, removable seal 208 seals the viscous fuel during storage and transport until the time of use, at which time it can be easily removed from the cartridge 200 exposing the methanol-permeable FVPL 210 through which the methanol fuel substance will be delivered to the fuel cell. Alternatively, a cartridge may be fabricated entirely of a methanol-impermeable material, a portion of which may be removed by the user to expose the viscous fuel and FVPL (Not shown).

FVPL Materials

The fuel vapor-permeable layer (FVPL) is used to contain the fuel within the fuel reservoir, while allowing vapor to pass through it, and also to prevent water from the fuel cell system from entering the viscous fuel solution. The FVPL may be comprised of a number of different materials that each have advantages in certain applications, and may be employed alternatively depending on the requirements and operating conditions of a particular application of the invention. For example, as illustrated in FIG. 3, a fuel cell cartridge 300 contains the viscous methanol fuel 302. In the fuel cell cartridge 300 illustrated in FIG. 3, the methanol-permeable FVPL 304 is substantially comprised of a material that is a monolithic barrier with good selectivity for methanol over water, i.e. it will allow more methanol than water to pass through. Silicone rubber films are good examples of a suitable selective materials which can be implemented as FVPLs. Urethane is another example of such a permeable film 304 for example, any number of polyurethane membranes or urethane meshes which are selective can be used for this function. The methanol-permeable layer 304 holds back the viscous fuel 302 and allows methanol vapor to travel out of the cartridge in the direction of the arrow A. In this instance, the highly selective FVPL 304 does not allow water that has been pushed back through the PCM, to travel back into the cartridge 300. Thus, water is prevented from entering into the fuel cartridge 300.

In some fuel cell systems, it may be preferable to provide multiple barriers, such as the barriers 306 through 314. Multiple barriers allow better control of the delivery rate of the methanol to the anode aspect of the fuel cell and minimize water introduction into the viscous fuel 302. The multiple barriers also even out any incontinuity in the delivery rate that could result from viscous fuel being in contact with parts of the barrier surface. The multiple layers 306 through 314 may be divided by vapor gaps, such as the gap 309, to ensure a continuous vapor delivery to the anode aspect of the fuel cell. Alternatively, they may be intimately bonded together.

Figure 4:
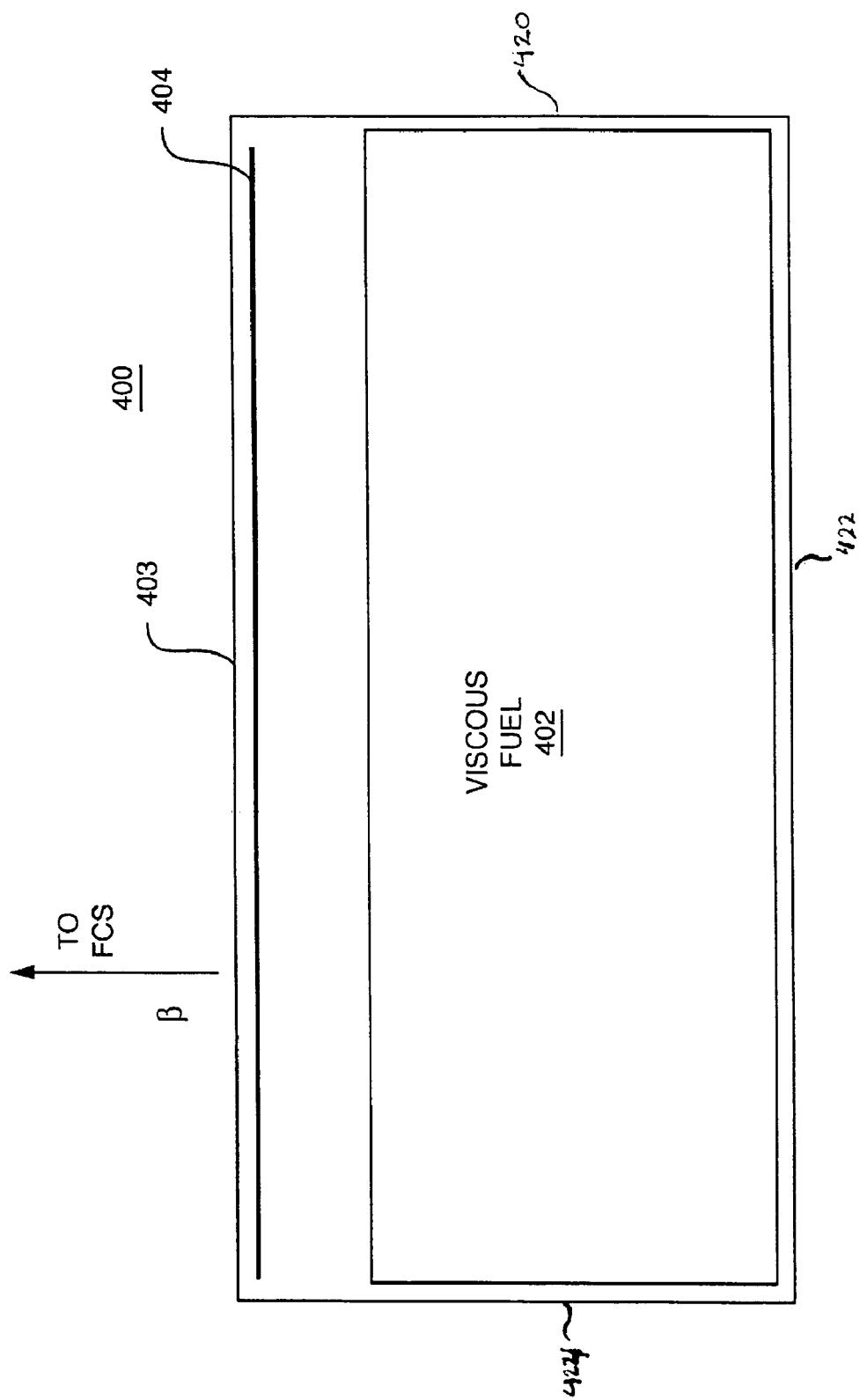
FIG. 4 is a schematic cross section of a fuel cartridge in accordance with the invention.

The FVPL may also be a non-selective membrane, as illustrated in FIG. 4. The fuel cartridge 400 includes a viscous fuel 402, and has an exterior frame 403, over at least a portion of which the FVPL 404 is disposed. The viscous fuel 402 includes the methanol that evaporates and flows in the direction of the arrow β across the FVPL 404. Here, the FVPL 404 is substantially comprised of a porous material, which may be a porous polypropylene, polyethylene, or expanded PTFE, for example.

In addition to this, the cartridge can simply be attached to the anode aspect of the fuel cell without a FVPL and the methanol vapor can simply travel to the anode aspect and be delivered unimpeded to the fuel cell system.

The remaining walls of the cartridge 400 (FIG. 4), such as the walls 420, 422 and 424 for example, may be comprised substantially of a methanol-impermeable material that does not react with the fuel substance, including, but not limited to polymers such as high density polyethylene and polypropylene, selected metals, or glasses.

Mechanical components can also be used to control the flow of methanol towards the anode aspect. For example, anode shuttering and other adjustable fuel delivery regulation assemblies were described in commonly-assigned U.S. patent application Ser. No. 10/413,986, which was filed on Apr. 15, 2003 by Hirsch et al. for a VAPOR FEED FUEL CELL SYSTEM WITH CONTROLLABLE FUEL DELIVERY, which is incorporated herein by reference. These can be used to power down the fuel cell, if desired.

Fuel Container with Reticulated Material

Figure 5:
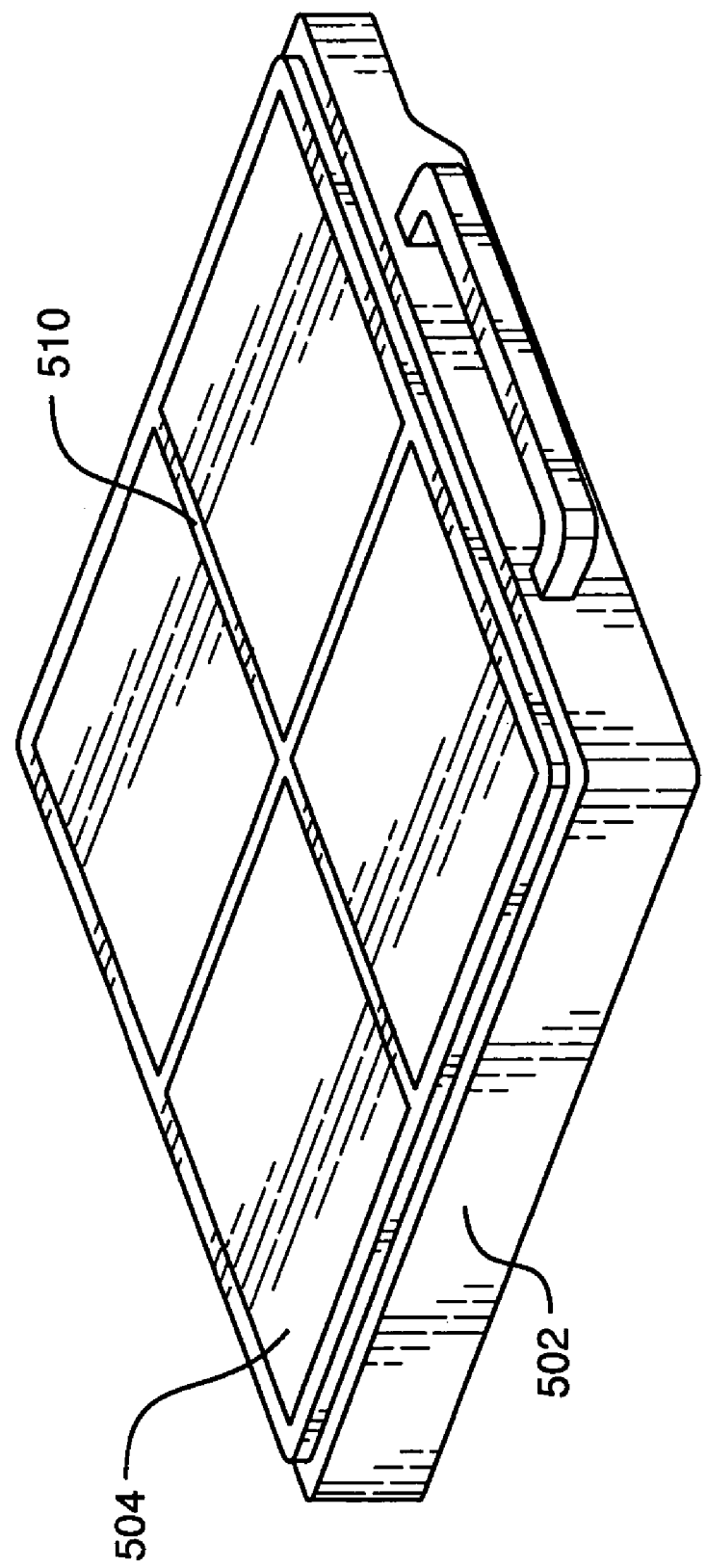
FIG. 5 is a fuel container in accordance with one embodiment of the present invention having a reticulated material disposed therein.

In accordance with one embodiment of the present invention, a fuel reservoir is depicted in FIG. 5 having a reticulated material 504 disposed therein. A purpose of the reticulated material 504 is to keep fuel, preferably a viscous fuel, in position within the fuel reservoir 502. The use of the material helps to prevent undesirable flow within the container during transportation and handling. Dividers 510 may be placed within the fuel reservoir 502 for the purpose of limiting fuel travel throughout the reservoir, resulting in more uniform fuel evaporation rates. The dividers 510 also help by impeding fuel flow and fuel travel within the fuel reservoir, further reducing any undesirable flow of fuel within the container, and the accumulation of fuel in one portion of the fuel tank when it is oriented in a manner other than its optimal intended orientation. The reticulated material 504 can be arranged to conform to many tank geometries, whereby irregular shapes can be filled. When the volume of the tank is substantially filled, more surface area may be created on the many surfaces of the material for evaporative purposes, thereby assisting the feed rate in a vapor-fed fuel system, such as those described in the above-mentioned application Ser. No. 10/688,433. Also, a more uniform distribution of the fuel for feeding the system is created in this manner. In addition, the combination of the reticulated material 504 and the viscous fuel of the present invention may inhibit fuel leakage from the container 502 in the event the container is compromised.

The material can be any reticulated material that does not react or degrade in the presence of the selected fuel. It is further preferred that the material be a non-hazardous material. Commercially available examples of such material that meet the criteria of the present invention are felts and foams. The felts can be either woven or non-woven fabrics or fibers, including fibers comprised of nylons, polyester polypropylenes, polyethelynes, PVDF, PTFE, polyethersulfones, or polyurethane, or combinations thereof. In the preferred embodiment the material is preferably 100% polyester. Commercially, polyester felt of this sort is available in sheets that are about 0.5 inches thick, and are sold by Superior Felt Superior Felt and Filtration, LLC, having an office at 28001 W. Concrete Dr., Ingleside, Ill. 60013. A typical density of this sheet of felt would be in range of 5-50 oz/yd$^2$, preferably being approximately 32 oz/yd$^2$, or approximately 85.33 oz/yd$^3$ for a volume. The reticulated foam or sponge could be any appropriate material including, but not limited to polyurethane foam.

In addition, porous fiber forms consisting of intricate networks of open-celled, omni-directional pores can also be used as the material. Using these materials, very open network can be achieved for a methanol fuel substance. In this embodiment, the fibrous network provides a framework for use with a viscous fuel substance, which encourages the limited transport of the viscous fuel within the fuel reservoir. A wide variety of thermoplastic polymers can be used to form the porous material including but not limited to assorted nylons, polypropylenes, polyethelynes, PVDF, PTFE, polyethersulfones and polyurethanes. Commercially, materials of this sort are available from Porex Porous Product Group, of 500 Bohannon Road, Fairburn, Ga. 30213.

Fuel Container Filling

Various methods may be employed to fill the fuel reservoir of the present invention, addressing the unique combination of the reticulated material and viscous fuel. Examples mentioned herein are meant to be taken as an example, and not as a limitation. Other methods not mentioned herein may be used while remaining within the scope of the invention.

Figure 6A:
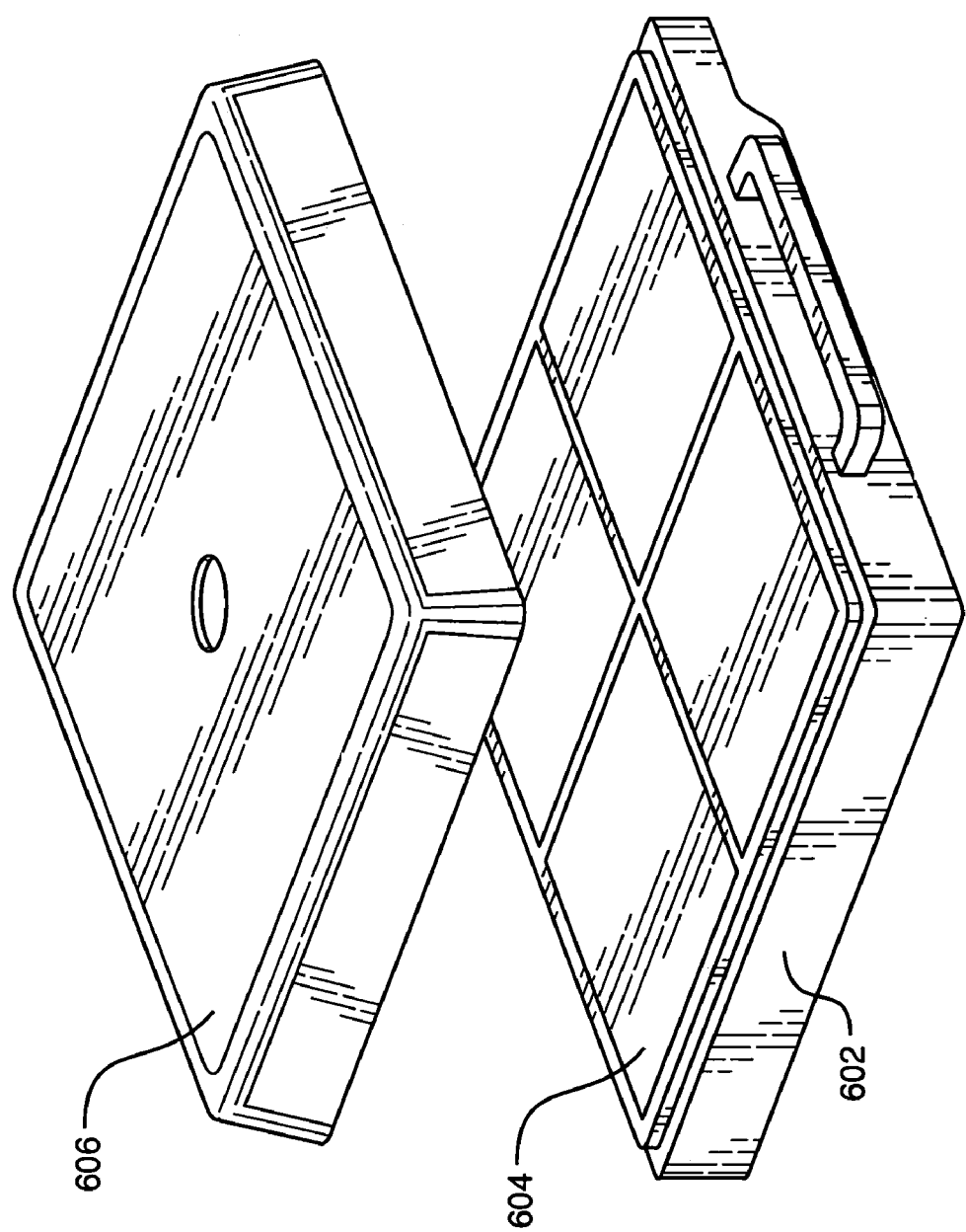
FIG. 6A is a fuel container in accordance with the present invention in an embodiment for fueling.
Figure 6B:
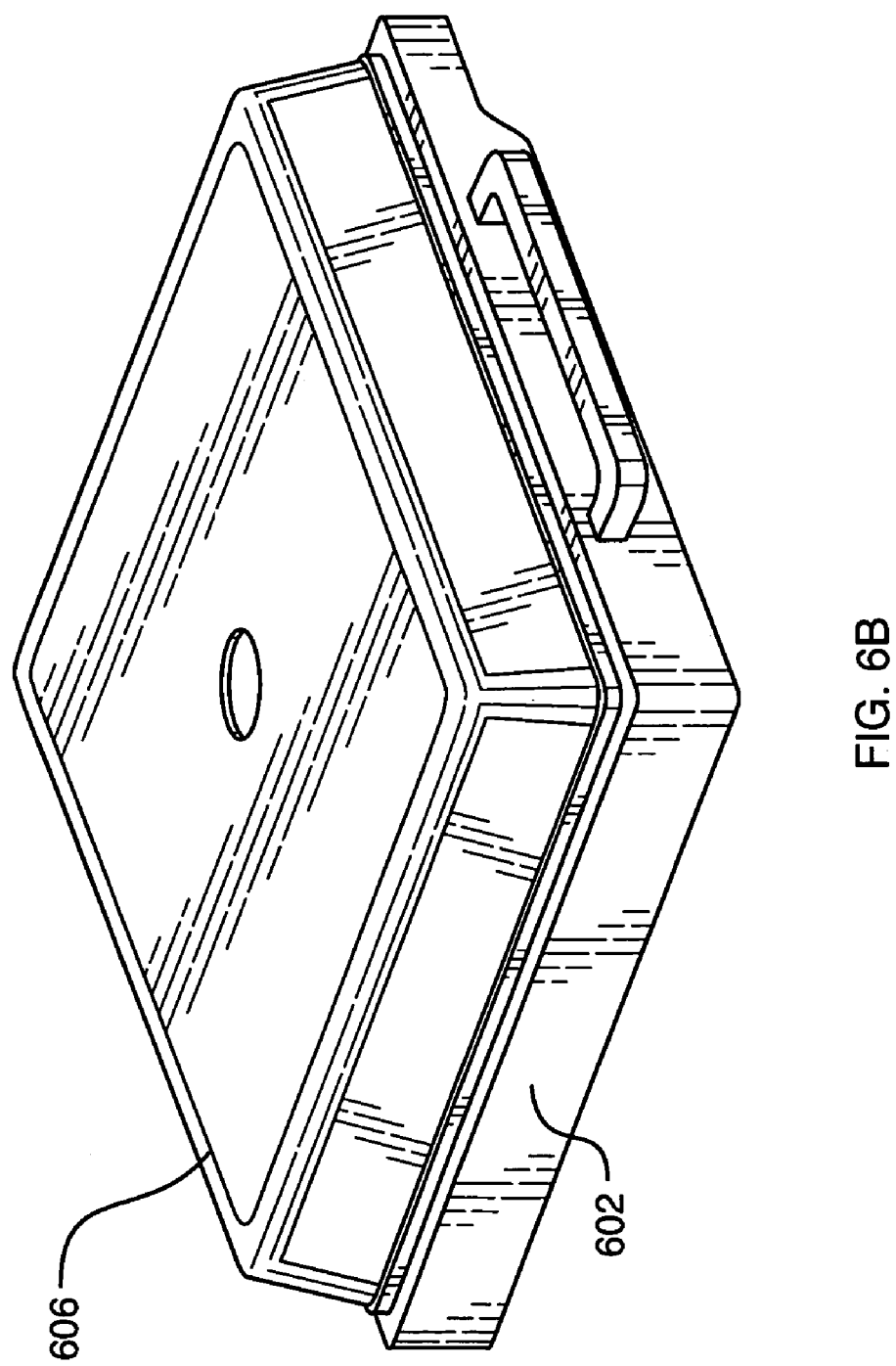
FIG. 6B is a fuel container in accordance with the present invention in an embodiment for fueling in assembled form.
Figure 7B:
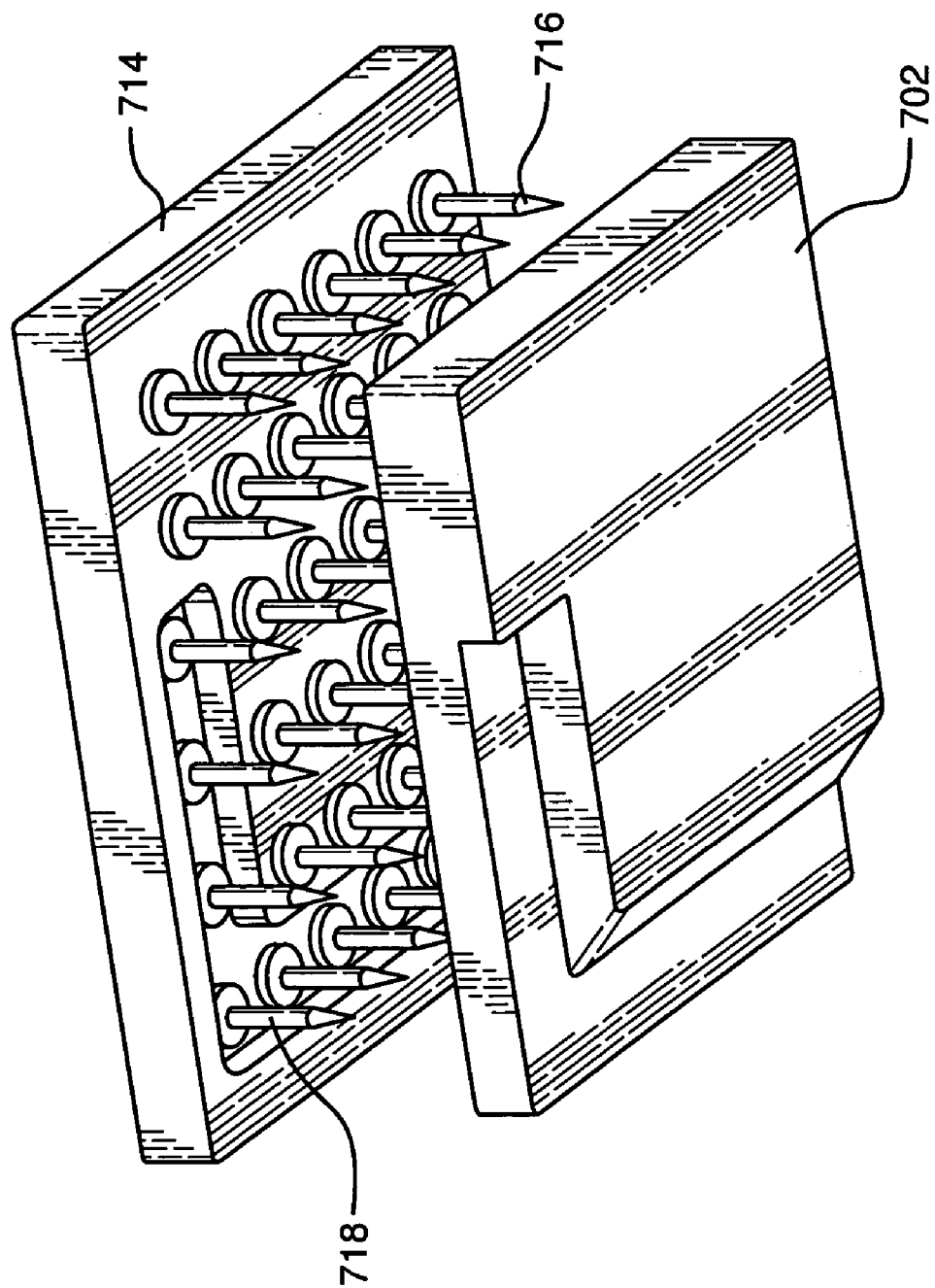
FIG. 7B is a fuel container in accordance with the present invention in an embodiment for automated fueling with multiple injection mechanisms.

One method that can be used to introduce fuel to the reservoir is by soaking the reticulated material in the viscous fuel, as depicted in FIGS. 6 through 7B. In FIG. 6A, a fuel reservoir 602 having the reticulated material 604 is shown. A cover 606 may be used to assure that any viscous fuel does not reach areas not adapted to receive the viscous fuel. FIG. 6B shows the parts of FIG. 6A in assembled form. In this method, the viscous fuel is introduced into the reservoir, and is allowed to soak its way into the many open voids formed by the material over time.

Another method that can be used to introduce fuel to the reservoir is by injecting is the fuel, shown in FIG. 7A. Again, depicted is the fuel reservoir 702, which contains the reticulated material 704 in accordance with the present invention. As can be seen, a needle 712 can be used to inject the fuel directly into the reticulated material 704, where full disbursement of the fuel can be achieved by a single placement of the needle 712, or through multiple placements of the same needle. Also, as can bee seen in FIG. 7B, an array 714 having a plurality of needles 716 disposed thereon for simultaneous insertion into the fuel reservoir 702 may be used to dispense fuel into the fuel container. Array 714 can be arranged as any shape that conforms to the geometry of the fuel cell, including, but not limited to, including one or more shorter or recessed needles 718 to deliver fuel to various points within the cartridge. It should be understood that the needles can be controlled by a human user or a robot designed for the task (not shown), and is not limited to the number of insertions into the fuel reservoir 702. The fuel can flow through the needle by any number of forces, including, but not limited to, a syringe, gravity, a pump, or a series of pumps (not shown).

Methods may be used in conjunction with those mentioned above in order to assist the viscous fuel filling. Shaking or vibrating the fuel reservoir may help distribute the viscous fuel throughout the many open areas within the reticulated material. Also, the absorption of the viscous fuel into the material may be aided by compressing the material while in the presence of the viscous fuel, and releasing it, thereby creating a sponge-like action. It is preferred that the fuel be absorbed into the voids created within the reticulated material, but it is possible to have the fuel absorbed into the material itself.

It should be understood by those skilled in the art that the above-mentioned methods for filling a fuel reservoir are not limited to having the reticulated material already seated within the fuel reservoir. It is within the scope of this invention to fill the fuel reservoir prior to inserting the reticulated material and also to fill the reticulated material prior to inserting it into the fuel reservoir. It should also be understood that the methods described herein are not limited to use with the viscous fuel, but could be used with any fuel to fill the reservoir of the present invention.

Applications

In addition to being carried and delivered from the fuel cartridge of the present invention as described herein, the viscous fuel of the present invention may be utilized by being added directly to a suitable compartment in an application device, or a suitable compartment in a fuel cell system that may be used to power a separate application device, or to back up or charge a rechargeable battery pack, which may in turn be used to power an application device, or otherwise in a hybrid power supply, or other useful application. These alternative embodiments of the invention are illustrated in FIGS. 8A through 8E.

Figure 8A:
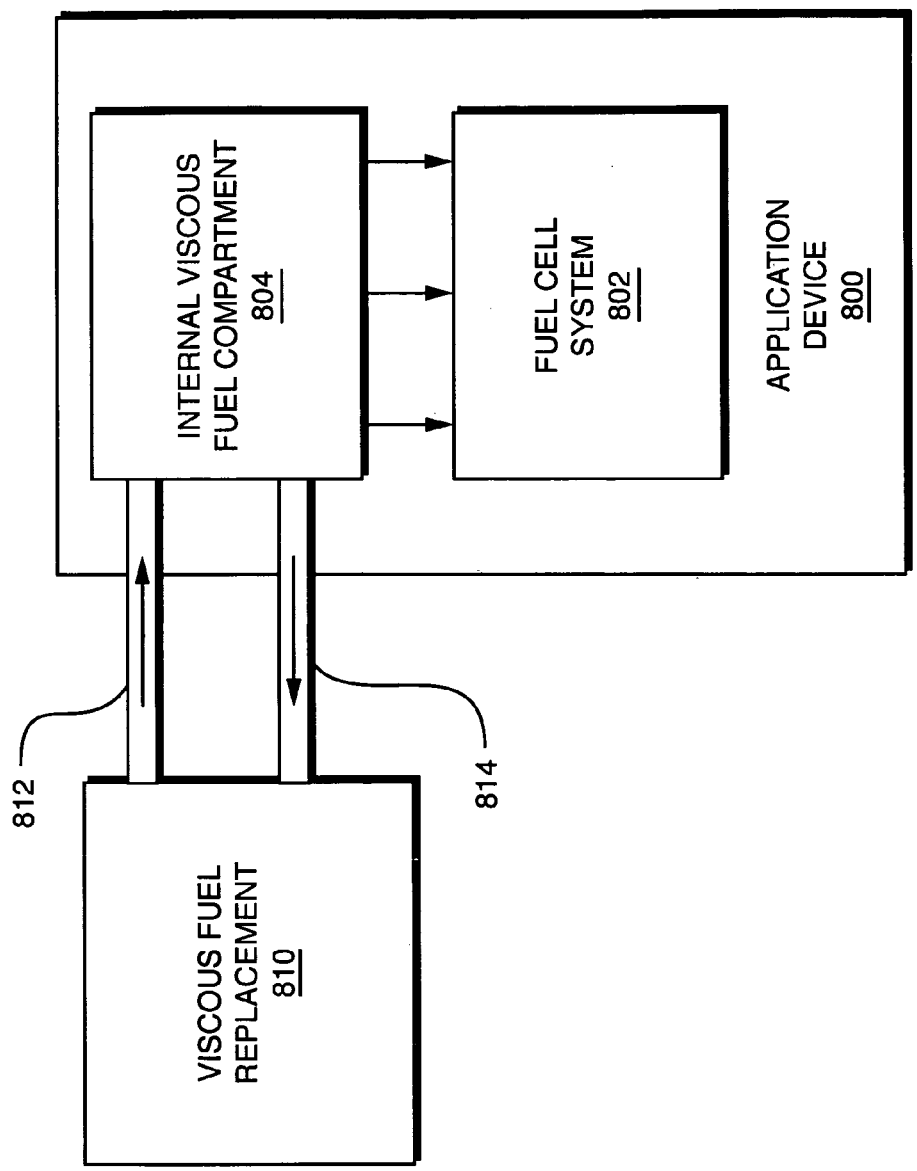
FIG. 8A is a schematic illustration of a viscous fuel replacement cartridge coupled to an application device in accordance with the invention.

FIG. 8A illustrates an application device 800 that is powered by a fuel cell system 802 that is either internally disposed or integrated into the application device, or which is mechanically fastened or bonded to, or otherwise attached to the application device. The fuel cell system 802 contains one or more fuel cells (not shown) that produce electricity for operation of the application device 800. The fuel cell system 802 is supplied with fuel from an internal viscous fuel compartment 804. The compartment 804 houses the viscous fuel of the present invention and delivers the fuel substance contained therein to the fuel cell system 802. When the usable fuel in the viscous fuel in the compartment 804 is exhausted, a separate cartridge or canister 810 can be suitably coupled to the application device via conduit 812 and replacement viscous fuel is delivered into the internal viscous fuel compartment 804. Such a canister was described in commonly-owned U.S. patent application Ser. No. 10/413,982, filed on Apr. 15, 2003, by Becerra et al., for an APPARATUS FOR REFUELING A DIRECT OXIDATION FUEL CELL, which is incorporated by reference herein, and refueling techniques were described in the present invention herein, and in commonly-owned U.S. patent application No. Ser. 10/607,699, filed on Jun. 27, 2003, by Alan J. Soucy, for METHODS OF PROVIDING REFU- ELING FOR FUEL CELL-POWERED DEVICES, which is incorporated by reference herein.

The replacement viscous fuel will either displace the remaining viscous fuel in the compartment 804, or a portion of the remaining viscous fuel or other substances can be removed, if desired, through an optional conduit 814.

Figure 8B:
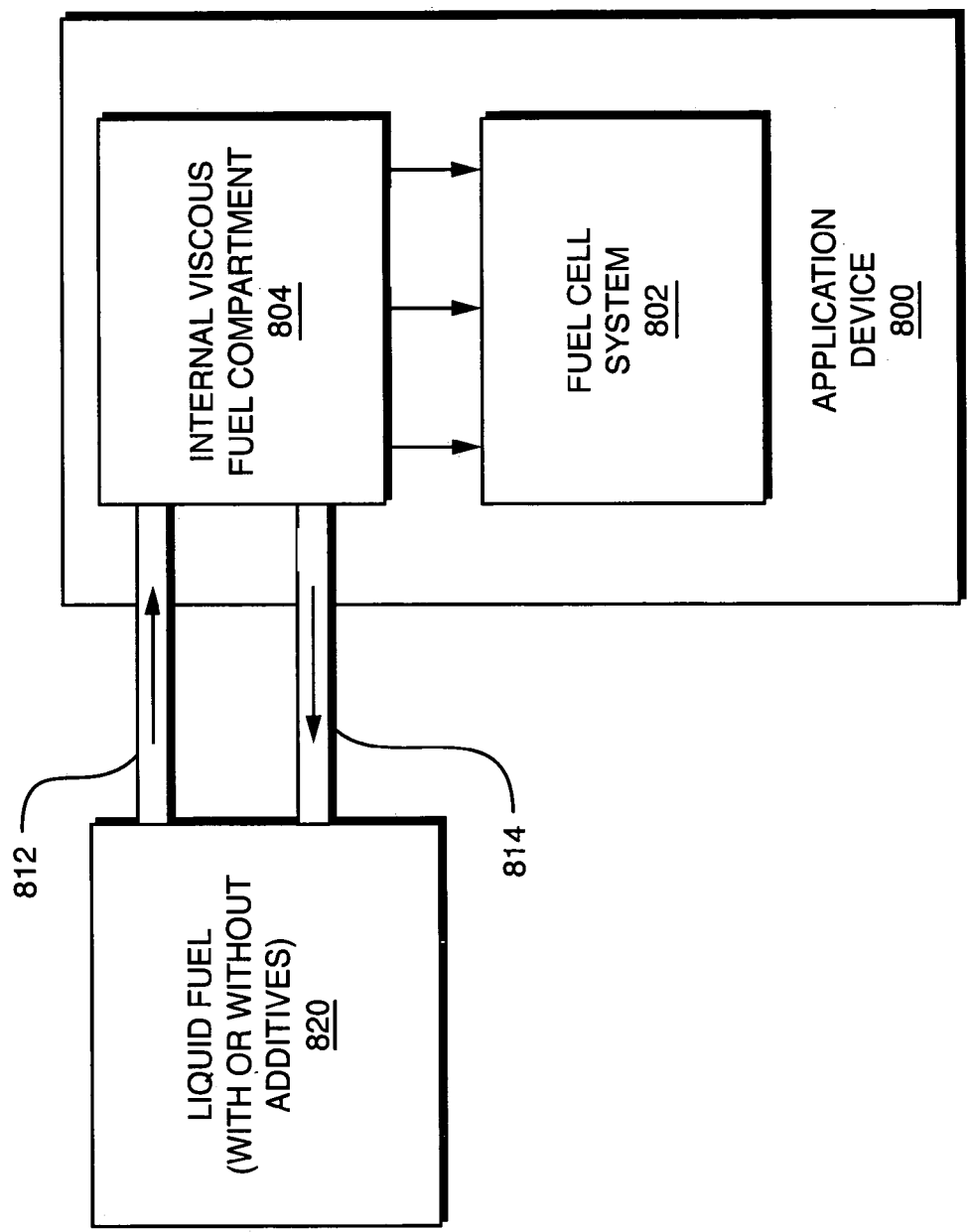
FIG. 8B is a schematic illustration of a liquid fuel replacement embodiment for refueling an application device in accordance with the invention.

FIG. 8B illustrates another embodiment of the invention and like components therein have the same references characters as in FIG. 8A. More specifically, an application device 800 is powered by a fuel cell system 802 that is fueled by the viscous fuel of the present invention contained within the compartment 804. However, in the embodiment of FIG. 8B, a liquid fuel is supplied from a suitable cartridge or canister 820. The liquid fuel may or may not contain additives such as those described herein. When the viscous fuel in the internal viscous fuel compartment 804 is exhausted, the liquid fuel in the cartridge or canister 820 is delivered to the compartment 804 through a conduit 812 in order to reconstitute the viscous fuel in the compartment by delivering, for example a fresh supply of fuel substance such as neat methanol to the remaining viscous fuel. Optional removal conduit 814 may also be provided to remove all or a portion of the viscous fuel, or other substances.

Figure 8C:
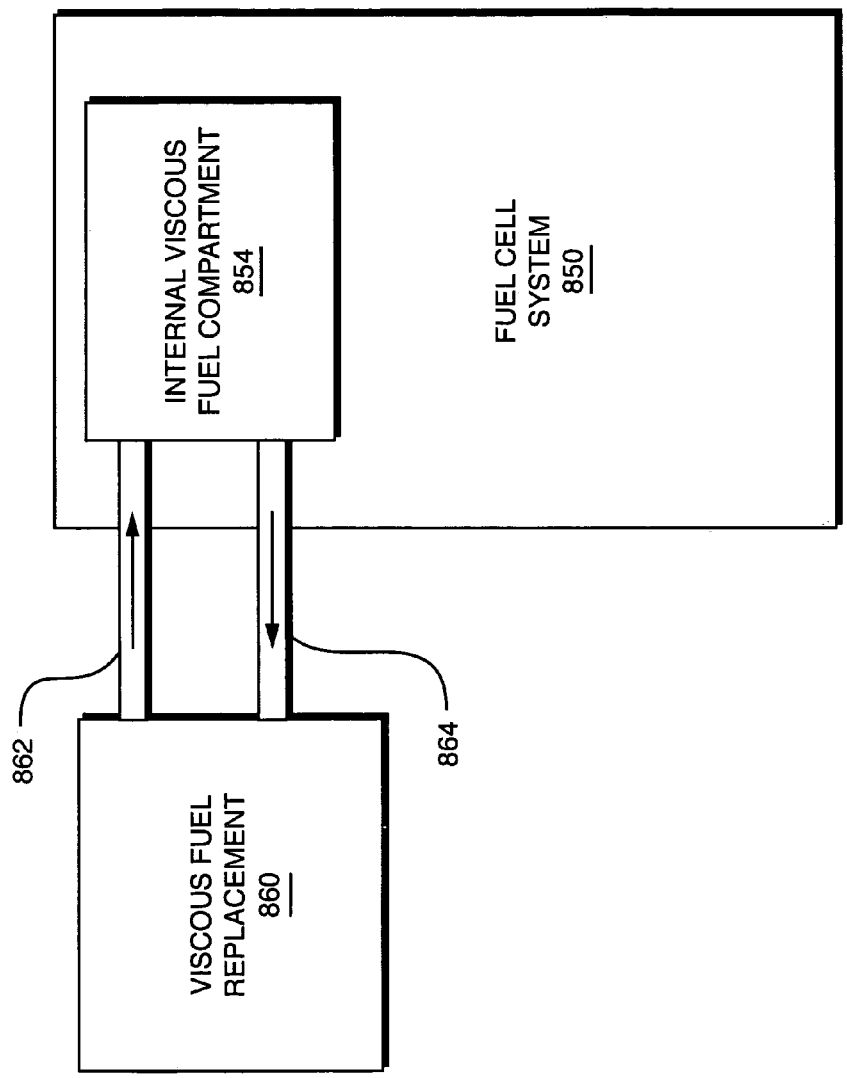
FIG. 8C is a schematic illustration of a viscous fuel replacement cartridge coupled to a fuel cell system in accordance with the invention.

FIG. 8C illustrates a fuel cell system 850 that includes an internal viscous fuel compartment 854, which contains the viscous fuel of the present invention that is delivered to a fuel cell, fuel cell stack or fuel cell array (not shown) contained with the fuel cell system 850. When the viscous fuel in the compartment 854 is used, it can be replaced with viscous fuel from a cartridge or canister 860 via a conduit 862. The cartridge or canister 860 can be any suitable device such as those described in the above-cited patent applications. An optional conduit 864 allows for removal of excess viscous fuel or other substances from the fuel cell system 850, if desired.

Figure 8D:
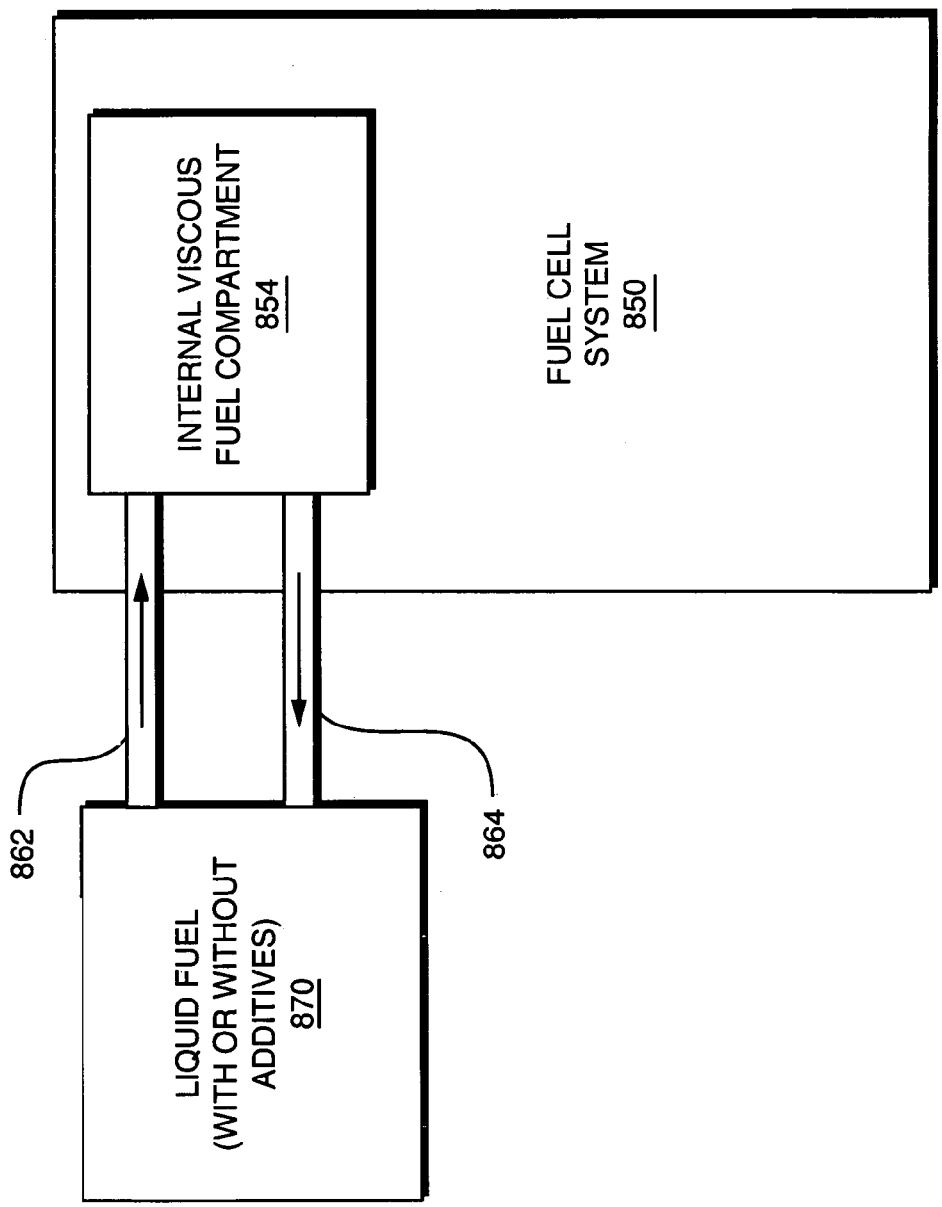
FIG. 8D is a schematic illustration of a liquid fuel replacement embodiment for refueling a fuel cell system in accordance with the invention.

FIG. 8D illustrates another embodiment of the invention and like components therein have the same references characters as in FIG. 8C. More specifically, a fuel cell system 850 includes an internal viscous fuel compartment 854 that houses the viscous fuel of the present invention. However, in the embodiment of FIG. 8D, a liquid fuel (with or without additives) is supplied from a suitable cartridge or canister 870. When the viscous fuel in the internal viscous fuel compartment 854 is exhausted, the liquid fuel in the cartridge or canister 870 is delivered to the compartment 854 through a conduit 862 in order to reconstitute the viscous fuel in the compartment by delivering, for example a fresh supply of fuel substance (such as neat methanol) to the remaining viscous fuel. The optional conduit 864 (as in the embodiment of FIGS. 8C) may be provided to remove exhausted viscous fuel or other substances from the fuel cell system 850.

In any of the embodiments described herein, the viscous fuel of the present invention may be stored in the sealed cartridge of the present invention or other suitable reservoir until it is ready for use. A seal can be provided which can be removed when the viscous fuel is ready for use, or for refueling. It is contemplated that the internal viscous fuel compartment, in the embodiments of FIGS. 8A-8D, can be disposed at any convenient, or available space within the device or fuel cell system, and its location will depend upon the particular application of the invention. In the cartridge embodiment, after the usable fuel substance in the cartridge is exhausted, in accordance with one embodiment of the invention, the fuel cartridge can simply be disposed of or recycled when it is empty, and new cartridge can be attached to the fuel cell. In an alternative embodiment, either the cartridge, the application device, or the fuel cell system (whichever is being used in the particular application) may be refueled, as noted herein, using the techniques of the present invention, or the above-incorporated, commonly owned U.S. patent application Ser. Nos. 10/413,982 and 10/607,699.

Figure 8E:
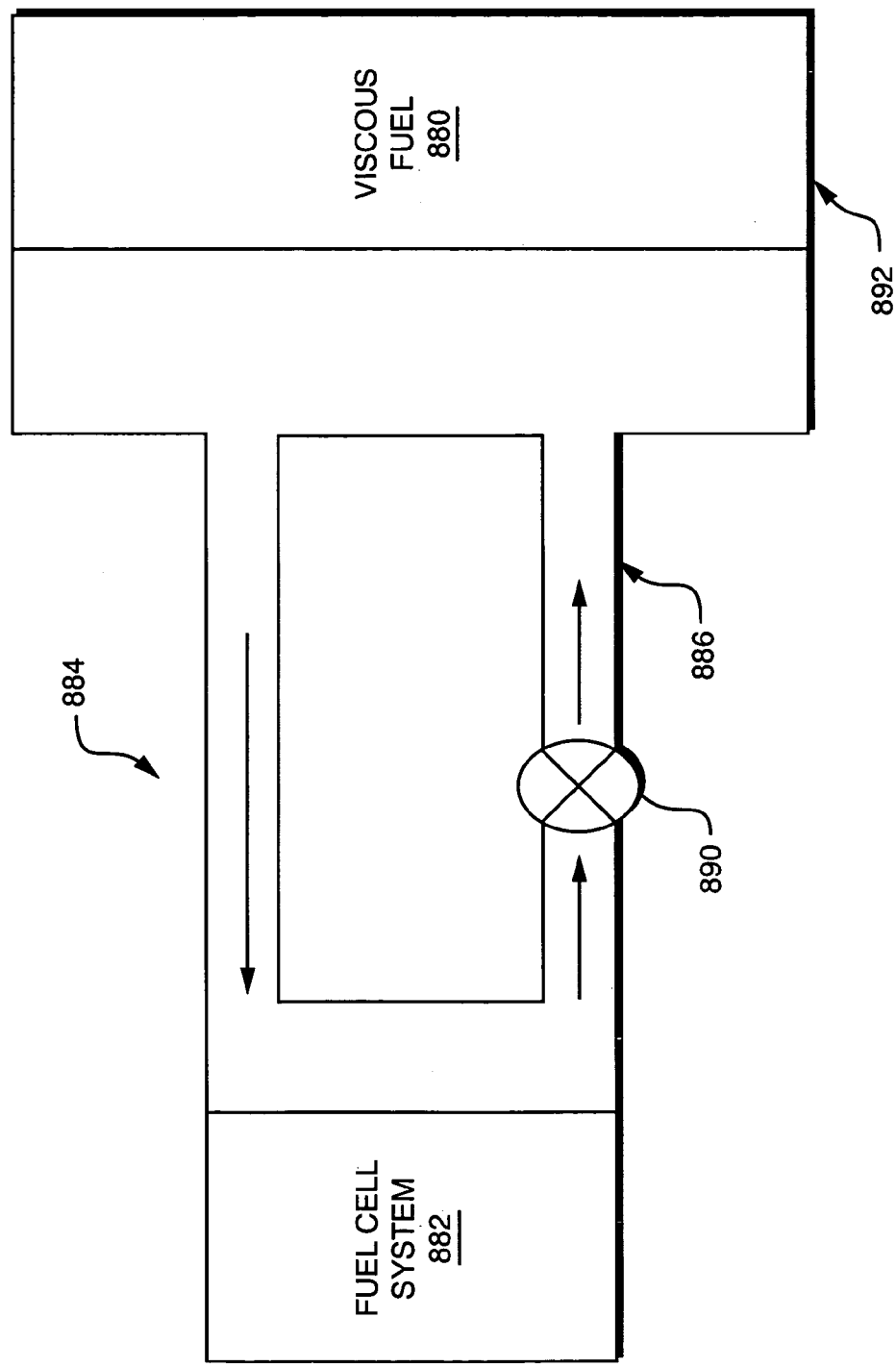
FIG. 8E is a schematic illustration of a viscous fuel replacement cartridge with a circulation loop.

In yet another aspect of the invention, illustrated in FIG. 8E, the fuel vapor circulates between the viscous fuel 880, which is disposed in a cartridge 892 and fuel cell system 882. In this illustrative embodiment a vapor delivery conduit 884, which carries fuel vapor from the viscous fuel to the fuel cell system is provided. A vapor return conduit 886 returns unreacted vapor from the fuel cell system to the viscous fuel where additional fuel vapor is picked up from the viscous fuel 880. Optional vapor management device 890, such as a fan or blower may be incorporated to encourage this circulation. Those skilled in the art will recognize that there are other means by which circulation may be accomplished.

It should be understood that the viscous methanol fuel of the present invention provides a freely flowing liquid, but that is controlled against substantial undesirable flow within the container and/or adverse effects in fuel efficiency. Preferably, it is delivered to a fuel cell via the novel fuel reservoir of the present invention, which includes a reticulated material disposed therein, which has orientation independence. The viscous fuel maintains a high feed rate and high fuel extraction efficiency with less crusting and less affectivity to vibration and shock than a thicker methanol gel. Accordingly, a safe, easy to handle and low-cost fuel container and associated fuel formulation for use with direct oxidation fuel cells that may be readily employed in consumer electronic devices has been presented.

The foregoing description has been directed to specific embodiments of the invention. It will be apparent, however, that other variations and modifications may be made to the described embodiments with the attainment of some or all of the advantages of such. Therefore, it is the object of the appended claims to cover all such variations and modifications as come within the true spirit and scope of the invention.

What is claimed is:

1. A fuel cartridge for storing fuel for a direct methanol fuel cell (DMFC) comprising:
   a fuel reservoir storing a carbonaceous fuel substance wherein said carbonaceous fuel substance is substantially comprised of neat methanol and a thickening substance that imparts viscosity to fuel substance, thereby forming a gel fuel; and
   a reticulated material disposed within said fuel reservoir storing the gel fuel.

2. A fuel cartridge as in claim 1, wherein said reticulated material substantially fills the volume of said fuel reservoir.

3. A fuel cartridge as in claim 1, wherein said reticulated material is substantially comprised of a felt.

4. A fuel cartridge as in claim 3, wherein said felt is substantially comprised of a woven material.

5. A fuel cartridge as in claim 3, wherein said felt has a density within the range of 5-50 oz/yd$^2$.

6. A fuel cartridge as in claim 3, wherein said felt has a density between 25 and 35 oz/yd$^2$.

7. A fuel cartridge as in claim 3, wherein said felt is substantially comprised of fibers selected from the group consisting of nylons, polyester polypropylenes, polyethelynes, PVDF, PTFE, polyethersulfones, polyurethane, and combinations thereof.

8. A fuel cartridge as in claim 1, wherein said reticulated material is substantially comprised of a foam.

9. A fuel cartridge as in claim 8, wherein said foam is substantially comprised of polyurethane.

10. A fuel cartridge as in claim 1, wherein said reticulated material is substantially comprised of a porous fiber form.

11. A fuel cartridge as in claim 10, wherein said porous fiber form is substantially comprised of a thermoplastic polymer selected from the group consisting of nylons, polypropylenes, polyethelynes, PVDF, PTFE, polyethersulfones and polyurethanes.

12. A fuel cartridge as in claim 1, wherein said fuel reservoir is refillable.

13. A method for use in storing fuel in a fuel cartridge for a direct methanol fuel cell (DMFC):

providing a fuel reservoir;

disposing a reticulated material within said fuel reservoir; and storing a carbonaceous fuel substance within the reticulated material, wherein said carbonaceous fuel substance is substantially comprised of neat methanol and a thickening substance that imparts viscosity to the fuel substance, thereby forming a gel fuel.

14. A method as in claim 13, further comprising: filling the substantial volume of said fuel reservoir with said reticulated material.

15. A method as in claim 13, wherein said reticulated material is substantially comprised of a felt.

16. A method as in claim 13, wherein said reticulated material is substantially comprised of a foam.

17. A method as in claim 13, wherein said reticulated material is substantially comprised of a porous fiber form.

18. A method as in claim 13, further comprising: vibrating said fuel resevoir, thereby assisting in introduction said fuel.

19. A method as in claim 13, further comprising: introducing the fuel to said fuel reservoir by immersing said reticulated material in said fuel.

20. A method as in claim 19, further comprising: soaking said reticulated material in said fuel.

21. A method as in claim 19, further comprising:

compressing said reticulated material while in said fuel; and releasing compression of said reticulated material while in said fuel.

22. A method as in claim 13, further comprising: introducing the fuel to said fuel reservoir by injecting fuel into said reticulated material.

23. A method as in claim 22, further comprising:

inserting at least one needle into said reticulated material; and pumping fuel through said at least one needle into said reticulated material.

24. A method as in claim 23, further comprising: providing an array of needles for said step of inserting.

* * * * *